Figure 1:
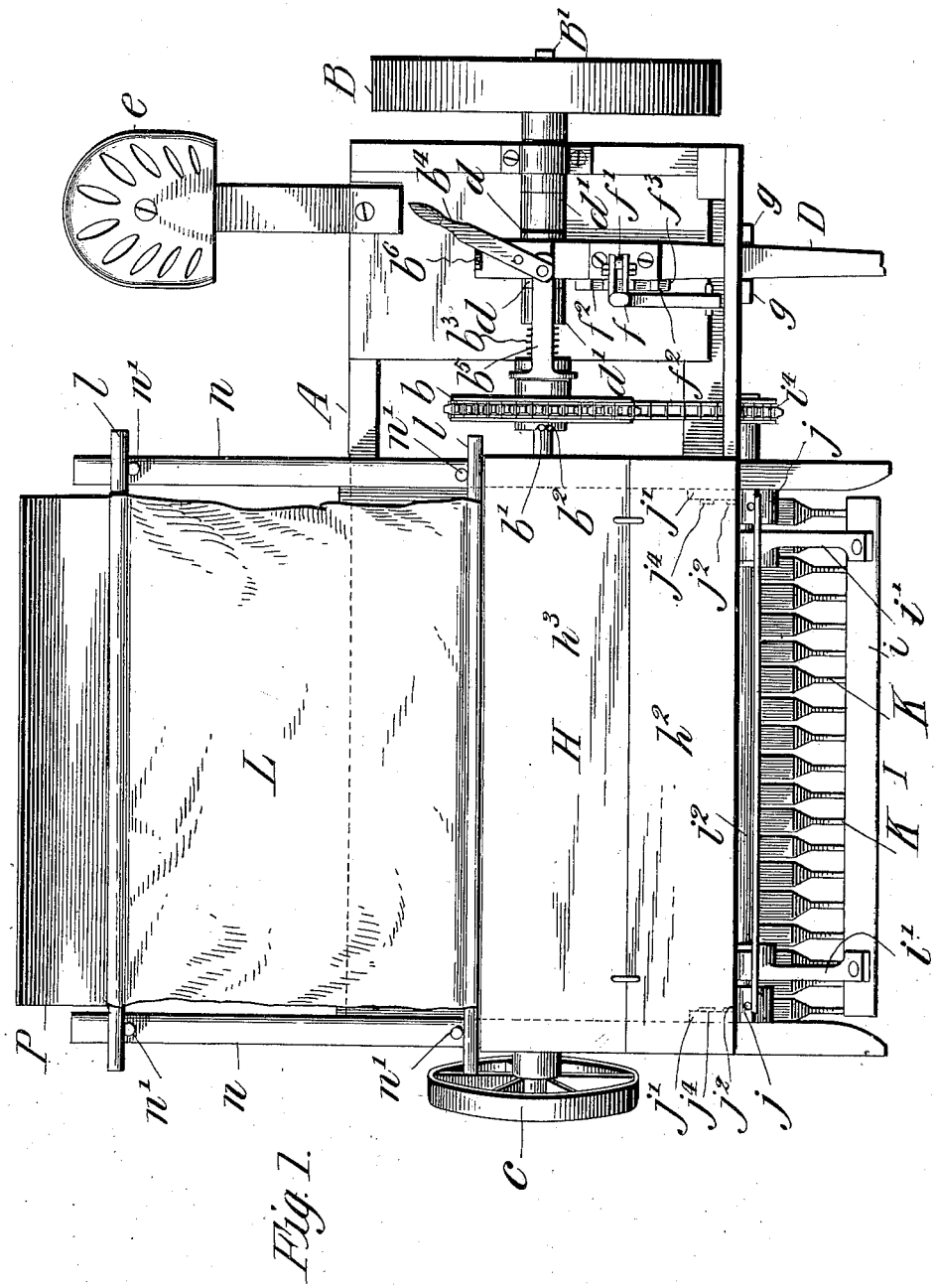

No. 656,830. Patented Aug. 28, 1900.
C. H. WHITNEY & S. F. GLENN.
HARVESTER FOR PEAS, BEANS, &c.
(Application filed Dec. 1, 1899.)

(No Model.) 3 Sheets—Sheet 1.

Witnesses
L. C. Hills.

Inventors
Charles H. Whitney and
Shelby F. Glenn
By W. W. Dudley
Attorneys

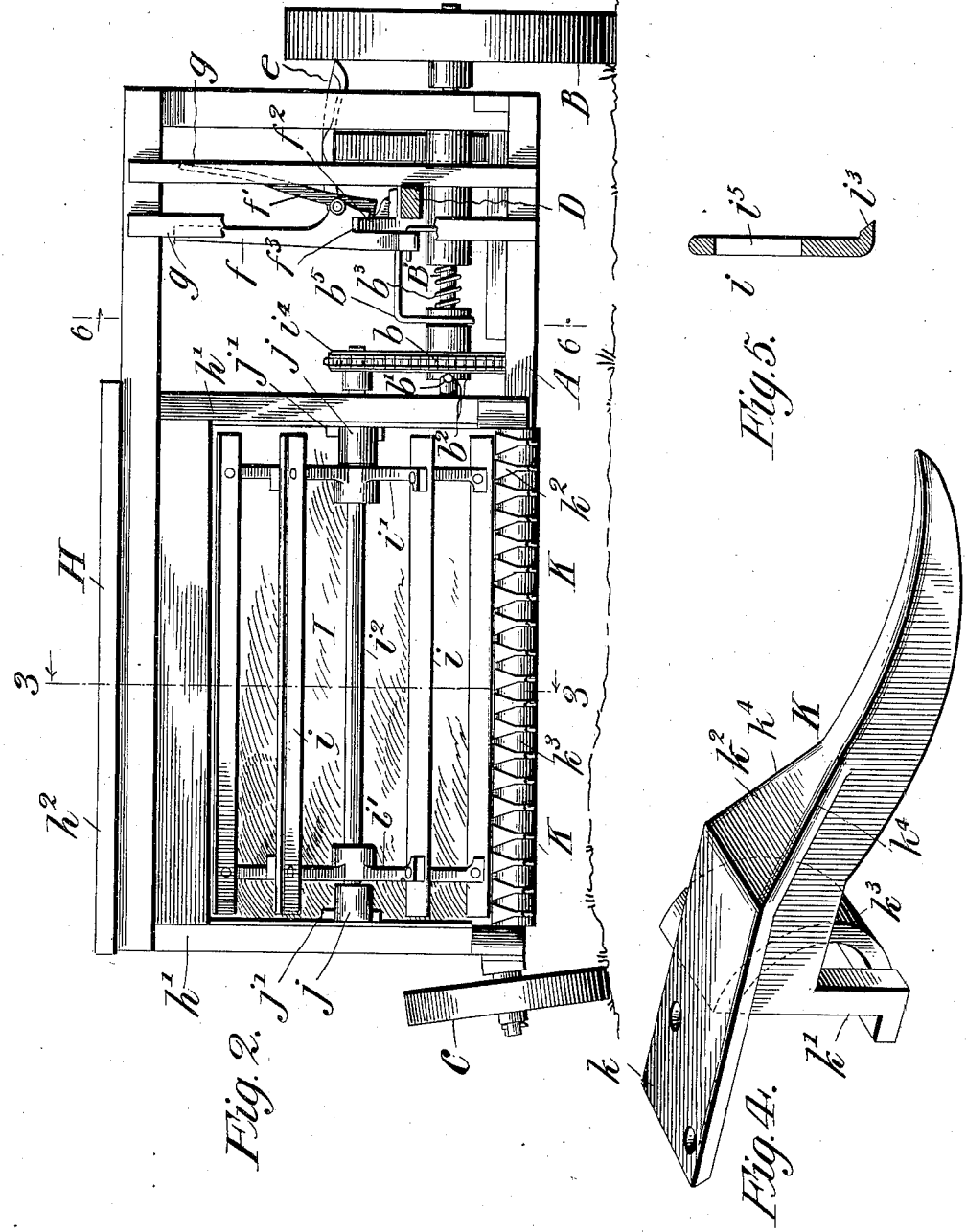

No. 656,830. Patented Aug. 28, 1900.
C. H. WHITNEY & S. F. GLENN.
HARVESTER FOR PEAS, BEANS, &c.
(Application filed Dec. 1, 1899.)
(No Model.) 3 Sheets—Sheet 3.
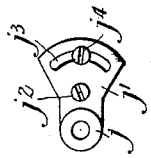
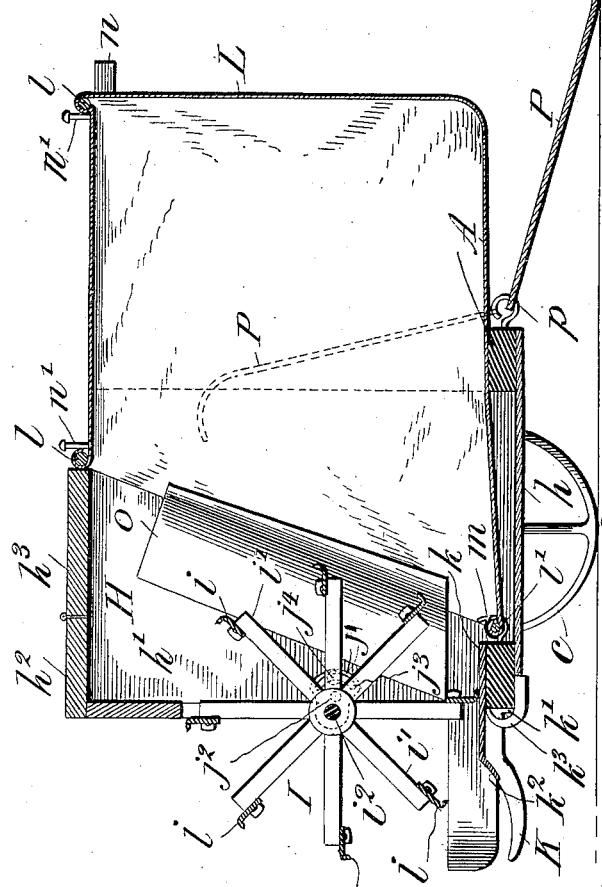
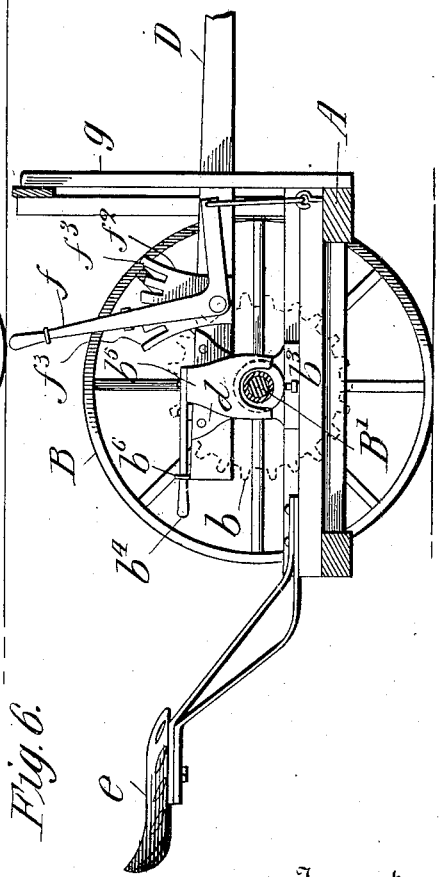
Witnesses:
Inventors
Charles H. Whitney
Shelby F. Glenn
By
Attorney

UNITED STATES PATENT OFFICE.

CHARLES H. WHITNEY, OF COOKEVILLE, AND SHELBY F. GLENN, OF CASSVILLE, TENNESSEE.

HARVESTER FOR PEAS, BEANS, &c.

SPECIFICATION forming part of Letters Patent No. 656,830, dated August 28, 1900.

Application filed December 1, 1899. Serial No. 738,835. (No model.)

*To all whom it may concern:*

Be it known that we, CHARLES H. WHITNEY, residing at Cookeville, in the county of Putnam, and SHELBY F. GLENN, residing at Cassville, in the county of White, State of Tennessee, citizens of the United States, have invented certain new and useful Improvements in Harvesters for Peas, Beans, &c.; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to machines for harvesting peas, beans, and the like, and has for its object the production of an improved machine of this character possessing advantages in point of simplicity of construction and efficiency in operation.

The nature of the invention will be readily comprehended from the following detailed description, which is to be read in connection with the accompanying drawings, in which—

Figure 1 is a top plan view of a pea-harvesting machine embodying our invention. Fig. 2 is a front elevation. Fig. 3 is a vertical sectional view taken through line 3 3, Fig. 2. Fig. 4 is a perspective view of one of the fingers. Fig. 5 is a cross-sectional view of one of the shelling-knives. Fig. 6 is a sectional view on line 6 6 of Fig. 2. Fig. 7 is a detail view of one of the bearing-plates for the shaft of the stripping-reel.

Referring to the said drawings by letter, A denotes the base-frame of the machine, which is supported at its ends on two wheels, one of which, B, is the drive-wheel, while the other, c, is inclined from the perpendicular to prevent the breaking down of unpicked peas. The drive-wheel is keyed on a short shaft B', journaled on the base-frame, and loose on this shaft is a sprocket-wheel $b$, through which movement is imparted to the stripping device presently to be described. The sprocket-wheel $b$ is adapted to be thrown into or out of clutch with the shaft, the latter to this end carrying pins or projections $b'$, which are caused to engage V-shaped notches $b^2$ in the end of the sprocket-wheel hub when the sprocket-wheel is moved inwardly. To move the sprocket-wheel into clutching position, there is employed a spring $b^3$, which is coiled around the shaft and interposed between a shoulder on the latter and the sprocket-wheel hub. To unclutch the sprocket-wheel, a lever $b^4$ is employed, which is pivoted on the inner end of the draft-tongue D to be within easy reach of the driver, who occupies the seat $e$, and to this lever is pivotally connected an arm $b^5$, having a downwardly-extending bifurcated member, which occupies an annular groove in the sprocket-wheel hub, by which construction movement of the lever is communicated to the sprocket-wheel to unclutch the latter when the machine is being turned and when it is being hauled to and from the field of operation. Inasmuch as the unclutching movement of the sprocket-wheel is against the action of the spring $b^3$, it is necessary to provide some retaining device for the lever, and such device may be in the nature of a shoulder $b^6$, from which the lever can be readily disengaged. The tongue D is at its inner end secured between ears $d$ on a sleeve $d'$, which is loose on the shaft.

The machine is provided at the front with harvesting-fingers, presently to be described, and to vary the height of the fingers from the ground there is provided an adjusting device consisting of an L-shaped lever $f$, pivoted on the tongue to bring its handle end within reach of the driver, the other end of the lever having link connection with the frame and which lever is moved forward and rearward to lower and raise the front end of the machine, the adjusted position being maintained by the engagement of a pivoted dog $f'$ with any one of a number of holes provided in a segmental plate $f^2$, carried by the tongue. The machine is constructed to have an approximately even balance, with the shaft B' and axle of the wheel $c$ as a center, so that little power is necessary to adjust the height of the fingers even though the machine may be in motion. At the front of the machine are uprights $g$, which prevent lateral movement of the tongue with relation to the machine, and $f^3$ are stops on the segmental plate which limit the range of adjustment of the fingers.

Supported on the base-frame is an open-ended casing H, having a base-piece $h$, sides $h'$, and a top $h^2$, the latter being formed in two sections, one of which, $h^3$, is hinged and can be raised to give access to the interior of the casing. I denotes the stripping-reel, which consists of a series of knives $i$, slotted at $i^5$ near their ends for adjustable attachment to spiders $i'$, which are keyed to a shaft $i^2$, journaled in bearings $j$ at the front of the casing. In the bottom of the casing are picker-fingers K, and to adjust the knives to and from the fingers the bearings $j$ are provided with securing-plates $j'$ of segmental form, each of which is pivoted on a screw $j^2$ and is provided beyond the pivotal connection with a curved slot $j^3$, through which is passed a set-screw $j^4$. Obviously by loosening the screws $j^4$ the shaft and reel may be lowered or raised to effect the adjustment of the knives to or from the fingers. The knives $i$ are of peculiar form. By reference to Fig. 5 it will be observed that each of the knives is provided near its outer side with a bend to bring the cutting edge $i^3$ approximately at a right angle to the body portion of the blade and that the cutting edge is formed by beveling the knife at the inner side. On the shaft $i^2$ is a sprocket-wheel $i^4$, which is actuated to rotate the reel through chain connection with the sprocket-wheel $b$. The sprocket-wheel $i^4$ is relatively of small diameter, whereby its number of revolutions in a given time is increased over the number of revolutions of the larger sprocket-wheel $b$, with the result that the reel is caused to pick the peas with sufficient rapidity to prevent the machine from clogging. In other words, the velocity of the reel is considerably in excess of the rate of travel of the machine, the difference in speed being governed by the relative sizes of the respective sprocket-wheels.

The picker-fingers K are preferably separably formed, but are secured side by side at their inner end to the front of the base-frame. Each of the fingers is provided at its upper rear side with a flange $k$, which projects rearwardly from the finger-body for attachment to the frame or finger-bar, the other point of attachment being a downwardly-projecting L-shaped extension $k'$, which abuts against the front and lower side of said frame or bar and serves to rigidly hold the finger in its extended position. The flange $k$ projects outwardly from each side of the finger-body and has an inclined approach $k^2$, the upper surface of which is a continuation of the upper side of the finger. The approach $k^2$ is of wedge form and acts to deflect the vines to the narrow channel between the juxtaposed flanges $k$ of adjacent fingers. The edges $k^4$ of the approach are rounded, while those of the flange are beveled, as shown in Fig. 4. The points of the fingers are below the plane of the flanges and are adjusted to catch the pods which are low down on the vine and to reach vines which lie on the ground or lean from the perpendicular, the object being to gradually raise the vines without danger of breakage and bring them into the path of the reel, which operates to cut or break loose the pods. Between the fingers, below the flanges, are abutments $k^3$, which are of convex form in vertical section. These abutments are in the path of the vines and operate to prevent green vines, weeds, grass, and the like from lodging on the edge of the finger-bar, as would be the case were the square edge of the bar presented to this material. The pods as they are stripped from the vines by the action of the rapidly-revolving reel are thrown by the latter into a pouch L, of canvas or other flexible material, which is supported at the rear side of the machine, with its open mouth at the rear of the casing. The pouch is rendered readily movable, its lower edge engaging hooks $m$ on the base-frame, while at its upper side are rods $l\ l$, to which the pouch is fastened and which extend beyond the pouch to rest on bars $n\ n$, extending out from the casing. Pins $n'\ n'$ are provided on the bars to form abutments for the rods $l$, whereby the upper portion of the pouch is stretched and made secure. The lower edge of the mouth of the pouch is stiffened by a rod $l'$, and plates $o$ on the inner sides of the casing are employed to confine the side edges of the pouch. This pouch receives all of the pods from the reel, and in the event that any of the pods are shelled in their passage the peas are recovered. The pouch is readily removed by disengaging the lower edge from the hooks. Secured to the rear side of the base-frame is an apron or drag P, which serves as a support for the pouch and prevents the latter from touching the ground. This apron is hinged at its inner side preferably by means of hoops $p$ on the frame engaging holes in the apron, whereby the latter may follow the inequalities of the ground and may be folded up when desired, as shown in dotted lines in Fig. 3. To enable folding of the apron, the pouch L is folded by releasing the outer rod $l$ and drawing it against the inner rod. The outer end of the apron is curved upward, whereby it is prevented from catching in the ground when backing or turning the machine.

We claim as our invention—

1. In a machine of the class described, the combination with picker-fingers, of a stripping-reel carrying radially-adjustable knives said knives having integral cutting edges approximately at a right angle to the body portions and formed by beveling at the inner sides, and multiplying-gearing between the drive-wheel and reel for imparting a velocity to the latter in excess of the rate of travel of the machine.

2. In a machine of the class described, picker-fingers having at their upper rear side flanges which are juxtaposed, to form channels for the vines, and having inclined approaches to said flanges, and curved abutments $k^3$ below the flanges.

3. In a machine of the class described, the combination with picker-fingers, of outwardly-curved abutments $k^3$ at the inner end of the channels between the fingers.

4. In a machine of the class described, a picker-finger having at its upper rear side above the plane of the finger-point side flanges which extend beyond the end of the finger for attachment to the frame, an inclined approach to said flange, and an extension of the finger at a right angle thereto affording the other point of attachment to the frame.

5. In a machine of the class described, the combination with stripper mechanism, of a pouch having a mouth at one end and removably attached at the lower edge of its mouth, and supported at its top by rods removably resting on bars, and pins on the bars affording abutments for the rods.

6. In a machine of the class described, the combination with stripper mechanism, of a casing partially inclosing said mechanism, a pouch having a mouth at one end and stiffening-rods at the top and bottom of its mouth and a rod at its upper rear end, hooks for securing the lower mouth side, bars extending from the upper end of the casing affording supports for the upper rods, pins on the bars for engagement with the rods, and plates on the inner sides of the casing for confining the sides of the pouch-mouth.

7. In a machine of the class described, the combination with a wheeled frame, a pouch suspended from the frame, and an apron or drag hinged to the rear of the frame to rest on the ground and to afford a support for the pouch, the outer end of the apron or drag being upwardly curved.

In testimony whereof we affix our signatures in presence of two witnesses.

CHARLES H. WHITNEY.
SHELBY F. GLENN.

Witnesses:
L. G. WHITNEY,
L. ARNOLD.